US011570130B2

(12) United States Patent
Wilde

(10) Patent No.: US 11,570,130 B2
(45) Date of Patent: *Jan. 31, 2023

(54) SYSTEM FOR DELIVERING NOTIFICATION MESSAGES ACROSS DIFFERENT NOTIFICATION MEDIA

(71) Applicant: Open Text Corporation, Waterloo (CA)

(72) Inventor: Erik Thomas Wilde, Zürich (CH)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,269

(22) Filed: Sep. 22, 2021

(65) Prior Publication Data

US 2022/0006765 A1     Jan. 6, 2022

Related U.S. Application Data

(63) Continuation of application No. 16/936,685, filed on Jul. 23, 2020, now Pat. No. 11,171,899, which is a (Continued)

(51) Int. Cl.
*H04L 51/06* (2022.01)
*H04L 45/302* (2022.01)
(Continued)

(52) U.S. Cl.
CPC ............ *H04L 51/06* (2013.01); *H04L 45/308* (2013.01); *H04L 51/063* (2013.01);
(Continued)

(58) Field of Classification Search
CPC ...... H04L 51/06; H04L 45/308; H04L 51/063; H04L 51/24; H04L 67/26; H04W 4/12
See application file for complete search history.

(56) References Cited

U.S. PATENT DOCUMENTS 7,509,304 B1 * 3/2009 Pather ................. H04L 51/24
8,478,310 B2   7/2013 Reding et al.
(Continued)

OTHER PUBLICATIONS

Office Action issued for U.S. Appl. No. 13/536,781 dated Sep. 18, 2014, 27 pages.
(Continued)

*Primary Examiner* — Philip C Lee
(74) *Attorney, Agent, or Firm* — Sprinkle IP Law Group

(57) ABSTRACT

A system for delivering notification messages across different notification media comprises a processor. A processor is configured to provide an indication of a new platform notification channel to one or more platform notification services. The indication is provided to one of the one or more platform notification services through a communication module specific to the one of the one or more platform notification services. The processor is configured to create a mapping from a new universal notification channel to a set of one or more platform notification channel identifiers. Each platform notification channel identifier of the set of platform notification channel identifiers is received from a platform notification service. The processor is configured to provide the set of one or more platform notification channel identifiers to a content provider of the new universal notification channel. The processor is coupled to the memory and is configured to store instructions.

21 Claims, 9 Drawing Sheets

Related U.S. Application Data continuation of application No. 16/419,875, filed on May 22, 2019, now Pat. No. 10,791,075, which is a continuation of application No. 13/536,781, filed on Jun. 28, 2012, now Pat. No. 10,348,657.

(51) Int. Cl.

| | | |
|---|---|---|
| *H04W 4/12* | (2009.01) | |
| *H04L 51/063* | (2022.01) | |
| *H04L 51/224* | (2022.01) | |
| *H04L 67/55* | (2022.01) | |

(52) U.S. Cl.
CPC ............ *H04L 51/224* (2022.05); *H04L 67/55* (2022.05); *H04W 4/12* (2013.01)

(56) References Cited

U.S. PATENT DOCUMENTS

| | | | |
|---|---|---|---|
| 10,348,657 | B1 | 7/2019 | Wilde |
| 10,791,075 | B2 | 9/2020 | Wilde |
| 2003/0154254 | A1 | 8/2003 | Awasthi |
| 2003/0167250 | A1 | 9/2003 | Sash |
| 2005/0266879 | A1 | 12/2005 | Spaur et al. |
| 2006/0075105 | A1 | 4/2006 | Momtchilov et al. |
| 2007/0100959 | A1* | 5/2007 | Eichstaedt ............... H04L 67/02 709/217 |
| 2008/0059593 | A1 | 3/2008 | Ban et al. |
| 2008/0201461 | A1 | 8/2008 | Yoshiuchi |
| 2009/0181646 | A1* | 7/2009 | Bouazizi ............... H04N 21/235 455/412.2 |
| 2010/0151782 | A1 | 6/2010 | Sato et al. |
| 2010/0161722 | A1 | 6/2010 | Jeon et al. |
| 2011/0093401 | A1* | 4/2011 | Waite ..................... G06Q 30/06 705/303 |
| 2011/0191798 | A1 | 8/2011 | Bassali et al. |
| 2012/0015630 | A1 | 1/2012 | Ryali et al. |
| 2012/0094637 | A1* | 4/2012 | Jeyaseelan ............... H04L 51/02 455/412.2 |
| 2012/0112908 | A1* | 5/2012 | Prykari ................... H04L 67/26 340/540 |
| 2012/0130778 | A1 | 5/2012 | Cotton et al. |
| 2012/0198020 | A1 | 8/2012 | Parker et al. |
| 2012/0204191 | A1 | 8/2012 | Shia et al. |
| 2012/0311046 | A1* | 12/2012 | Grigoriev ............... H04W 4/12 709/206 |
| 2013/0061046 | A1 | 3/2013 | Joy et al. |
| 2013/0084896 | A1* | 4/2013 | Barkie ................ H04L 12/1859 455/466 |
| 2013/0144974 | A1* | 6/2013 | Haakenson ............. H04L 51/10 709/217 |
| 2013/0151273 | A1 | 6/2013 | Jones et al. |
| 2014/0120864 | A1* | 5/2014 | Manolarakis ......... H04W 24/08 455/405 |
| 2019/0273704 | A1 | 9/2019 | Wilde |
| 2020/0358727 | A1 | 11/2020 | Wilde |

OTHER PUBLICATIONS

Office Action issued for U.S. Appl. No. 13/536,781 dated Apr. 23, 2015, 21 pages.
Office Action issued for U.S. Appl. No. 13/536,781 dated Apr. 21, 2016, 25 pages.
Office Action issued for U.S. Appl. No. 13/536,781 dated Dec. 1, 2016, 26 pages.
Office Action issued for U.S. Appl. No. 13/536,781 dated Jun. 20, 2017, 26 pages.
Office Action issued for U.S. Appl. No. 13/536,781 dated Jan. 16, 2018, 26 pages.
Office Action issued for U.S. Appl. No. 13/536,781 dated Aug. 28, 2018, 32 pages.
Notice of Allowance issued for U.S. Appl. No. 16/936,685, dated Jul. 6, 2021, 9 pages.

* cited by examiner

400

Mapping Table

| Universal Notification Channel ID | Platform 1 Notification Service ID | Platform 2 Notification Service ID | Platform 3 Notification Service ID |
|---|---|---|---|
| Client 1; ID 22 | 20945 | 11552 | 4699 |
| Client 1; ID 49 | 89899 | 32203 | 5006 |
| Client 1; ID 78 | 40771 | 88705 | 8944 |
| Client 2; ID 35 | 28044 | 34395 | 9856 |
| Client 2; ID 42 | 95017 | 84571 | 161 |
| Client 3; ID 4 | 59233 | 10177 | 5068 |
| Client 4; ID 9 | 28392 | 77147 | 6867 |

Fig. 4

SYSTEM FOR DELIVERING NOTIFICATION MESSAGES ACROSS DIFFERENT NOTIFICATION MEDIA

CROSS-REFERENCE TO RELATED APPLICATION(S)

This application is a continuation of, and claims a benefit of priority under 35 U.S.C. 120 of the filing date of U.S. patent application Ser. No. 16/936,685 filed Jul. 23, 2020, entitled "System for Delivering Notification Messages Across Different Notification Media," issued as U.S. Pat. No. 11,171,899, which is a continuation of U.S. patent application Ser. No. 16/419,875 filed May 22, 2019, entitled "System for Delivering Notification Messages Across Different Notification Media," issued as U.S. Pat. No. 10,791,075, which is a continuation of U.S. patent application Ser. No. 13/536,781 filed Jun. 28, 2012, entitled "System for Delivering Notification Messages Across Different Notification Media", issued as U.S. Pat. No. 10,348,657, which are incorporated herein by reference in their entirety.

BACKGROUND

Many systems exist for delivery of notification messages. They are useful for both business applications (e.g., delivering updates on a software bug tracking system, delivering stock quotes, delivering appointment reminders) and consumer applications (e.g., delivering news updates, delivering sports results, delivering event reminders). In the past, systems delivered reminders either via a push system (e.g., simple mail transfer protocol (SMTP) email transfer, short message service (SMS)) or a user retrieval based system (e.g., feeds using resource description framework site summary (RSS) or Atom format for web feeds). Delivering messages in either of these ways is relatively straightforward, a content provider for a push system needs to maintain a user list and deliver the message to all users; a content provider for a user retrieval system need only publish the messages in a predetermined location using a predetermined format. Modern users demand messages delivered to their mobile smart phones. Different smart phone manufacturers each provide a notification delivery service for their branded phones, each notification delivery service operating using different protocols and different message types, and often provided as a service by the phone manufacturers or phone operating system manufacturers themselves.

BRIEF DESCRIPTION OF THE DRAWINGS

Various embodiments of the invention are disclosed in the following detailed description and the accompanying drawings.

FIG. 4 is a diagram illustrating an embodiment of a mapping table.

DETAILED DESCRIPTION

Figure 1:
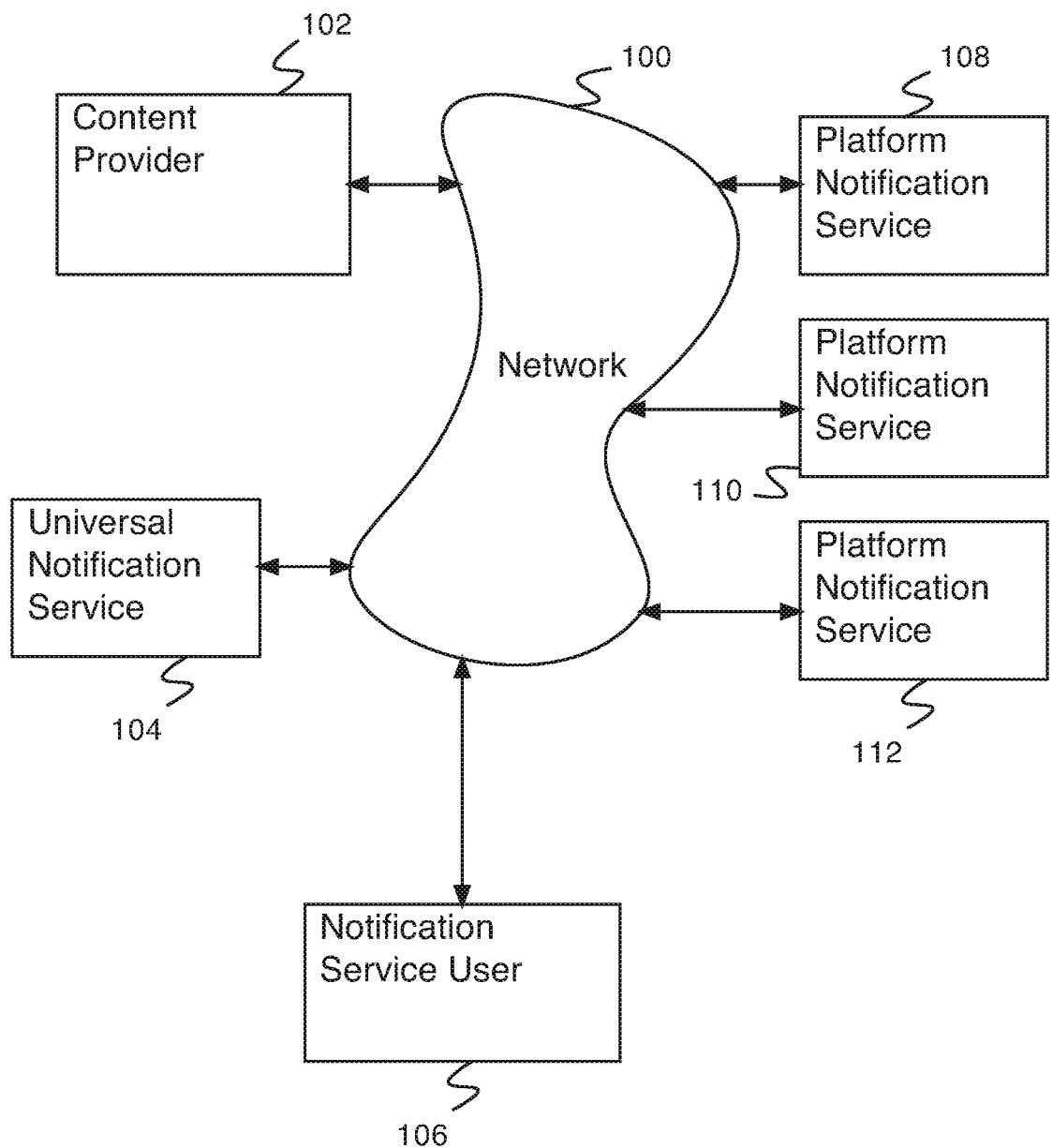
FIG. 1 is a block diagram illustrating an embodiment of a system for delivering notification messages across different notification media.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for delivering notification messages across different notification media is disclosed. A processor is configured to provide an indication of a new platform notification channel to one or more platform notification services. The indication is provided to one of the one or more platform notification services through a communication module specific to the one of the one or more platform notification services. The processor is configured to create a mapping from a new universal notification channel to a set of one or more platform notification channel identifiers. Each platform notification channel identifier of the set of platform notification channel identifiers is received from a platform notification service. The processor is configured to provide the set of one or more platform notification channel identifiers to a content provider of the new universal notification channel. The processor is coupled to the memory. The memory is configured to store instructions for the processor.

In some embodiments, a system for delivering notification messages across different notification media is disclosed. A system for delivering notification messages across different notification media comprises a processor and a memory. The processor is configured to: receive an indication of a new notification channel from a content provider; send an indication of the new notification channel to one or more platform notification services, wherein the indication is sent to each of the one or more platform notification services through a communication module specific to that platform notification service; receive a notification channel identifier from each of the one or more platform notification services corresponding to the new notification channel; create a mapping from the new notification channel to the set of one or more notification channel identifiers; send the set of one or more notification channel identifiers to the content provider; receive an indication of a new notification handle on the new notification channel from the content provider; and use the mapping to provide the new notification handle to each of the one or more platform notification services, wherein the new notification handle is sent to each of the one or more platform notification services through the communication module specific to that notification service. The memory is coupled to the processor and configured to store instructions for the processor.

In some embodiments, a system for delivering notification messages across different notification media delivers notification messages to a set of users. In some embodiments, the set of users comprises a set of users using smart phones, different subsets of the set of smart phones comprising smart phones using different operating systems (e.g., Apple iPhones, Google Android phones, RIM Blackberry phones, Windows Phone phones, etc.). Each operating system manufacturer maintains a platform notification service specific to the operating system (e.g., Apple maintains an iPhone specific platform notification service; Google maintains an Android specific platform notification service). Each platform notification service can create a new platform notification channel, add subscribers to the platform notification channel, and deliver messages to the subscribers on the platform notification channel. A system for delivering notification messages across different notification media (e.g., a universal notification service) receives a request from a content provider to create a new universal notification channel across different notification platforms. The system requests creation of a new platform notification channel on each platform notification service and maintains a mapping table linking the universal notification channel to the platform notification channels created on each platform notification service. It then provides the set of platform notification channel identifiers to the content provider, so the content provider can advertise them to users. When the content provider wishes to deliver a new content item, it provides the content item to the universal notification service, which uses the mapping table to deliver it to each platform notification service. The platform notification services then deliver the messages to subscribed users of the platform notification channels. In some embodiments, the messages delivered to subscribed users of the platform notification channels are not complete messages but indications of messages, if a user receives an indication of a message and is interested in retrieving the complete message, he may follow an included link or use another mechanism to retrieve the complete message from the content provider.

In some embodiments, the processor of the system is additionally configured to receive a new notification channel indication of the new universal notification channel from the content provider. In some embodiments, the notification channel indication is associated with a subscription request. In some embodiments, the processor is additionally configured to receive a platform notification channel identifier corresponding to the new universal notification channel from each of the one or more platform notification services. In some embodiments, the processor is further configured to receive a new notification handle indication of a new notification handle on the new universal notification channel from the content provider. In some embodiments, the processor is further configured to use the mapping to provide the new notification handle to the one or more platform notification services, wherein the new notification handle is sent to one of the one or more platform notification services through the communication module specific to the one of the one or more platform notification services. In some embodiments, the new notification handle is set to a user using one of the one or more platform notification services. In some embodiments, the new notification handle is used to retrieve a full notification associated with the new notification handle, wherein the full notification is sourced from the content provider. In various embodiments, the full notification is achieved using a link, the full notification is achieved using an application, the full notification is achieved using a web site, or any other appropriate want to achieve the notification. In some embodiments, the platform notification service of the one or more platform notification services comprises a smart phone operating system developer. In various embodiments, smart phone operating system developer comprises an Apple push notification service, an Android push notification service, a Windows Phone push notification service, a Blackberry push notification service, or any other appropriate service. In some embodiments, the mapping uses an identifier for the new universal notification channel.

FIG. 1 is a block diagram illustrating an embodiment of a system for delivering notification messages across different notification media. In the example shown, FIG. 1 comprises network 100. In various embodiments, network 100 comprises one or more of the following: a local area network, a wide area network, a wired network, a wireless network, the Internet, or any other appropriate communication network. In some embodiments, network 100 comprises several different networks that are used for communication between elements of the system. The system comprises content provider 102, universal notification service 104, notification service user 106, platform notification service 108, platform notification service 110, and platform notification service 112 communicate via network 100. Content provider 102 comprises a content provider providing a feed of content to users. For example, content provider 102 comprises an online news service, a reminder service, a business department, or any other appropriate content provider. Content provider 102 comprises a content provider desiring to deliver notification messages across different notification media. Notification service user 106 comprises a notification service user receiving notifications via a notification service. In some embodiments, notification service user 106 comprises a user receiving notifications on a mobile phone (e.g., a smart phone). In some embodiments, notification service user 106 comprises a user receiving notifications from a platform notification service (e.g., one of platform notification service 108, platform notification service 110, and platform notification service 112) specific to the operating system of the users mobile phone. In some embodiments, notification service user 106 receives notifications via a delivery network. In various embodiments, the delivery network connects notification service user 106 to a wide area network, to a local area network, to the Internet, or to any appropriate network. In some embodiments, the delivery network comprises network 100. In some embodiments, notification service user 106 comprises a user desiring to receive notifications from a content provider (e.g., content provider 102). In various embodiments, there are 1, 100, 222, 1369, or any other appropriate number of notification service users in the system for delivering notification messages across different notification media. In the example shown, platform notification service 108, platform notification service 110, and platform notification service 112 comprise platform notification services for delivering notifications to notification service users (e.g., notification service user 106). For example, each of platform notification service 108, platform notification service 110, and platform notification service 112 comprise platform notification services associated with a smart phone operating system developer (e.g., Apple™ Push Notification Service, Android™ Cloud to Device Messaging Service, Windows™ Phone Push Notification Service, Blackberry™ Push Notification Service, SMS, etc.) for delivering notifications to notification service users using smart phones and using the associated smart phone operating system. In the example shown, universal notification service 104 comprises a system for delivering notification messages across different notification media. In some embodiments, universal notification service 104 comprises a system for communicating with content provider 102 and platform notification service 108, platform notification service 110, and platform notification service 112. In some embodiments, universal notification service 104 comprises a system for allowing a content provider (e.g., content provider 102) to deliver content across multiple platform notification services (e.g., platform notification service 108, platform notification service 110, and platform notification service 112) while treating them as a single notification service. In some embodiments, when content provider 102 wants to distribute a notification, it transmits the notification to universal notification service 104, associated with a universal notification channel on which to transmit the notification. Universal notification service 104 determines the appropriate platform notification channel for each platform notification service, and transmits the notification to platform notification service 108, platform notification service 110, and platform notification service 112, using appropriate communication protocols for each platform notification service. Platform notification service 108, platform notification service 110, and platform notification service 112 each determine a list of notification service users subscribed to their platform notification channel, and transmit the message to each notification service user, including notification service user 106, if appropriate.

In some embodiments, different networks are used for different parts of the system; for example, a message is sent to the service, which may contact a SMS gateway, that will then send actual notification to users via a global system for mobile communications (GSM) network. On the other hand, separate networks, delivery networks, connect the users to the platform services.

Figure 2:
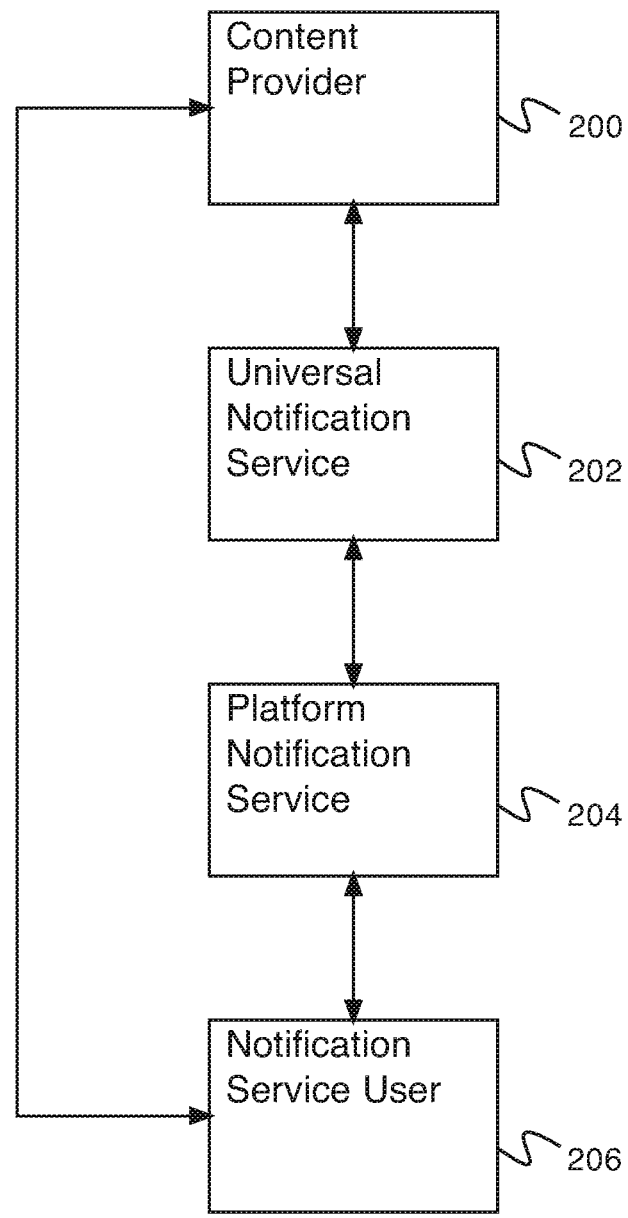
FIG. 2 is a block diagram illustrating an embodiment of communication paths in a system for delivering notification messages across different notification media.

FIG. 2 is a block diagram illustrating an embodiment of communication paths in a system for delivering notification messages across different notification media. In some embodiments, the system for delivering notification messages across different notification media comprises the system for delivering notification messages across different notification media of FIG. 1. In the example shown, content provider 200 communicates with universal notification service 202. In various embodiments, content provider 200 communicates with universal notification service 202 to request creation of a new universal notification channel, to receive platform notification channel identifiers, to deliver a new notification handle associated with a universal notification channel, or for any other appropriate purpose. Universal notification service 202 communicates with platform notification service 204. In some embodiments, universal notification service 202 communicates with more than one platform notification service. In various embodiments, universal notification service 202 communicates with platform notification service 204 to request creation of a new platform notification channel, to receive a platform notification channel identifier, to deliver a new notification handle associated with a platform notification channel, or for any other appropriate purpose. Platform notification service 204 communicates with notification service user 206. In some embodiments, platform notification service 204 communicates with more than one notification service user. In various embodiments, platform notification service 204 communicates with notification service user 206 to receive a subscription request, to deliver a new notification handle, or for any other appropriate purpose. Notification service user 206 communicates with content provider 200. In various embodiments, notification service user 206 communicates with content provider 200 to receive a platform notification channel identifier, to request a notification based on a new notification handle, to receive a notification, or for any other appropriate purpose.

Figure 3:
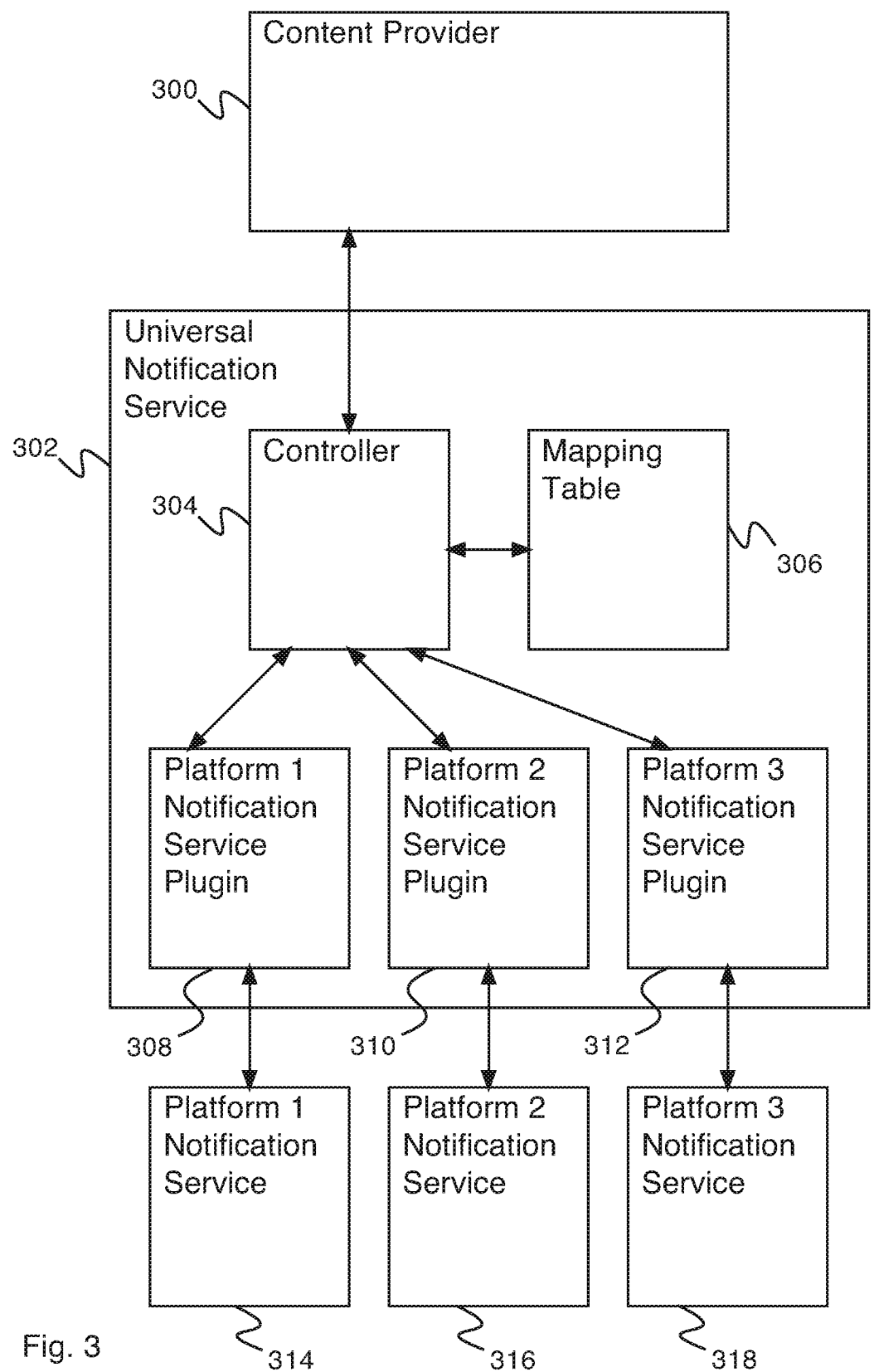
FIG. 3 is a block diagram illustrating an embodiment of a universal notification service.

FIG. 3 is a block diagram illustrating an embodiment of a universal notification service. In some embodiments, universal notification service 302 comprises universal notification service 104 of FIG. 1. In the example shown, universal notification service 302 communicates with content provider 300 and platform 1 notification service 314 (e.g., a platform notification service for platform 1), platform 2 notification service 316 (e.g., a platform notification service for platform 2), and platform 3 notification service 318 (e.g., a platform notification service for platform 3). Universal notification service 302 comprises controller 304, mapping table 306, platform 1 notification service plugin 308, platform 2 notification service plugin 310, and platform 3 notification service plugin 312. Controller 304 communicates with content provider 300, e.g., to receive a request for a new universal notification channel, to receive a new notification handle, etc. Controller 304 communicates with platform 1 notification service 314, platform 2 notification service 316, and platform 3 notification service 318 via platform 1 notification service plugin 308, platform 2 notification service plugin 310, and platform 3 notification service plugin 312, respectively. A platform notification service plugin (e.g., each of platform 1 notification service plugin 308, platform 2 notification service plugin 310, and platform 3 notification service plugin 312) serves as a communications translator, including all information required for communicating with the associated platform notification service (e.g., platform 1 notification service plugin 308 communicates with platform 1 notification service 314, etc.). Controller 304 delivers messages to each platform notification service plugin (e.g., new platform notification channel messages, new notification handle messages, etc.) and the platform notification service plugin formats the message accordingly and delivers it to its associated notification service according to the appropriate protocol. In the event that a new notification service is added to the system for delivering notification messages across different notification media (e.g., a new smart phone operating system is introduced which the universal notification service needs to deliver notifications to), a new associated platform notification service plugin can be developed and added to universal notification service 302, enabling the system to deliver notifications to the new notification service without changing the operation of controller 304.

When content provider 300 requests a new universal notification channel from universal notification service 302, controller 304 receives the request, generates a universal notification channel ID and in turn requests platform notification channels from each of platform 1 notification service 314, platform 2 notification service 316, and platform 3 notification service 318, via platform 1 notification service plugin 308, platform 2 notification service plugin 310, and platform 3 notification service plugin 312, respectively. Each platform notification service creates the new platform notification channel and returns the platform notification channel ID to universal notification service 302. Controller 304 receives the platform notification channel IDs (via the platform notification service plugins) and creates a mapping from the universal notification channel ID to the received platform notification channel IDs. The mapping is stored in mapping table 306, allowing controller 304 to deliver a new notification handle to the appropriate platform notification channels for a given universal notification channel. Controller 304 additionally delivers the set of platform notification channel IDs to content provider 300, allowing content provider 300 to advertise the platform notification channel IDs to notification system users, allowing the notification system user to discover a notification channel on a content provider system (e.g., on a content provider website) and register for the appropriate platform notification channel on the appropriate platform notification service.

FIG. 4 is a diagram illustrating an embodiment of a mapping table. In some embodiments, mapping table 400 comprises mapping table 306 of FIG. 3. In the example, shown, mapping table 400 comprises a set of mappings of universal notification channel IDs to sets of platform notification service IDs. Each universal notification channel ID comprises a content provider identifier (e.g., "Client 1"; "Client 2"; etc.) and a content provider notification channel ID (e.g., "ID 22"; "ID 49"; etc.). In some embodiments, the universal notification service will only deliver notifications received from the content provider associated with the universal notification channel. In some embodiments, the universal notification service will deliver notifications received from any of a set of content providers indicated in the mapping table. In some embodiments, the universal notification service will deliver notifications from any content provider. Corresponding to each universal notification channel ID is a set of platform notification service IDs. Each platform notification service ID corresponds to a platform notification channel on a platform notification service. When a universal notification service controller receives a new notification handle from a content provider on a universal notification channel, it looks up the universal notification channel ID in the mapping table and retrieves the corresponding set of platform notification service IDs. Each notification service ID in the set of platform notification service IDs is sent along with the message handle to the appropriate platform notification service plugin, which communicates a properly formatted message to the associated platform notification service.

In some embodiments, there would be much more data managed in such a table—for example, all kind of housekeeping stuff. In some embodiments, the identifier spaces for the various platforms are different. In some embodiments, the channels would not need to be specific for just a client. In various embodiments, a channel would be open to various clients or even public, so that the user population addressed through that channel could be addressed by more than just one client, or any other appropriate configuration for the channel.

Figure 5:
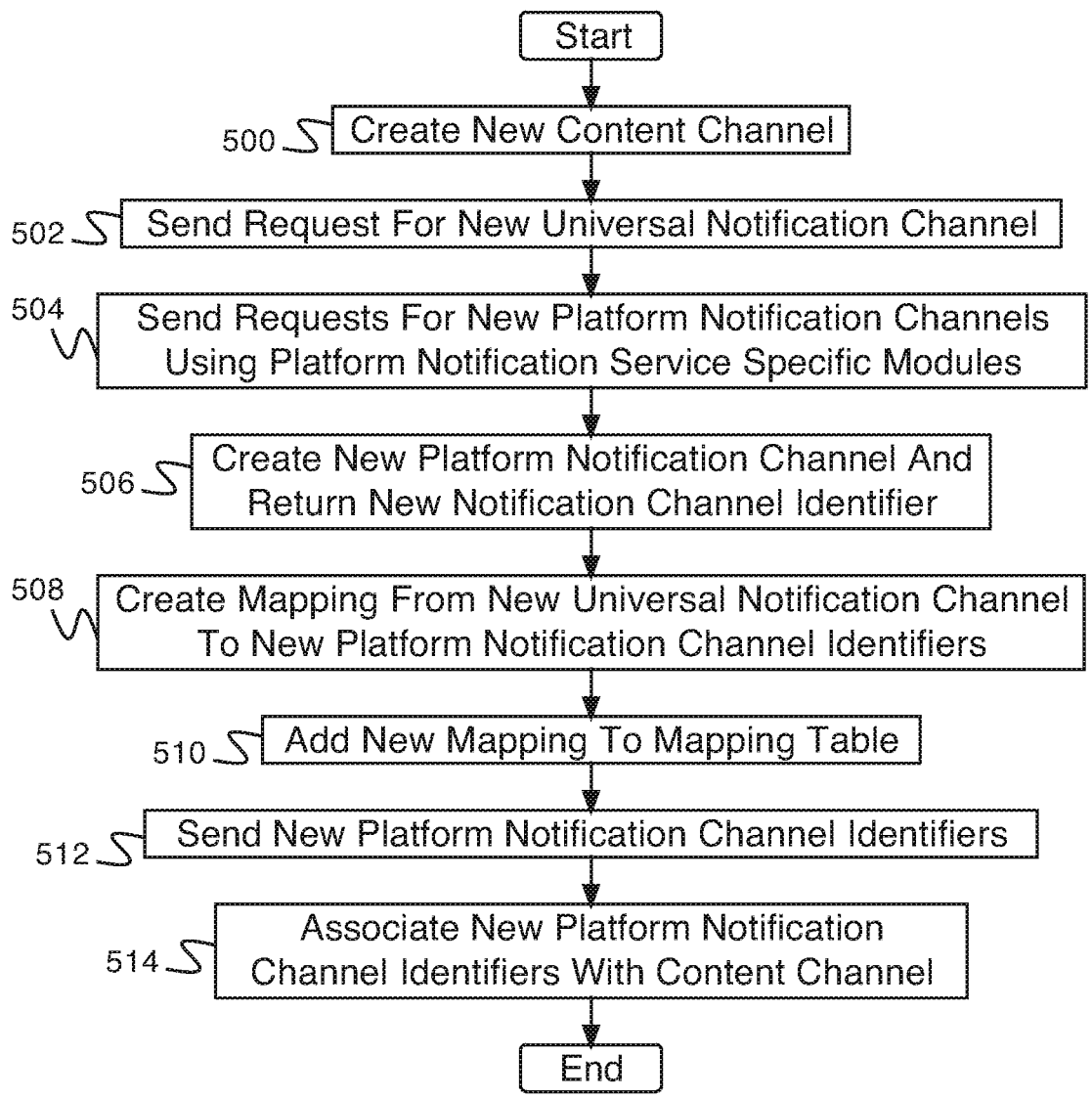
FIG. 5 is a flow diagram illustrating an embodiment of a process for creating a new universal notification channel.

FIG. 5 is a flow diagram illustrating an embodiment of a process for creating a new universal notification channel. In some embodiments, the process of FIG. 5 comprises a process of creating a new universal notification channel on a universal notification service (e.g., universal notification service 104 of FIG. 1) for allowing a content provider (e.g., content provider 102 of FIG. 1) to deliver content to multiple notification service users (e.g., notification service user 106 of FIG. 1) via multiple platform notification services (e.g., platform notification service 108 of FIG. 1, platform notification service 110 of FIG. 1, and platform notification service 112 of FIG. 1). In the example shown, in 500, a new content channel is created. For example, a new content channel is created by a content provider (e.g., an online news service, a reminder service, a business department, an online bug tracking system, etc.). In various embodiments, a new content channel may comprise a news channel (e.g., current results from the French Open, current news about Sudan, etc.), a reminder service channel (e.g., current meeting time updates for the software development group, rehearsal time updates for a theater group, etc.), or any other appropriate new content channel. In 502, a request for a new universal notification channel is sent. For example, a request for a new universal notification channel is sent from the content provider to the universal notification service. In some embodiments, the universal notification channel comprises a distribution channel for the content channel (e.g., the content channel created in 500). In 504, requests for new platform notification channels are sent using platform notification service specific modules. For example, requests for new platform notification channels are sent from the universal notification service to each of the multiple platform notification services (e.g., Apple Push Notification Service, Android Cloud to Device Messaging Service, Windows Push Notification Service, Blackberry Push Notification Service, SMS, etc.). In some embodiments, a platform notification service specific module exists for each platform notification service. In some embodiments, each platform notification service specific module comprises information enabling communication with the platform notification service.

In 506, a new platform notification channel is created and a new notification channel identifier is returned. For example, a new notification channel is created by each of the platform notification services, and the new notification channel identifiers are returned to the universal notification service. The new platform notification channels each correspond to a platform specific version of the universal notification channel (e.g., the universal notification channel requested in 502). In 508, a mapping is created from the new universal notification channel to the new platform notification channel identifiers. For example, a mapping is created by the universal notification service. In some embodiments, a mapping from the new universal notification channel to the new platform notification channel identifiers comprises a correspondence between a new universal notification channel identifier and the new platform notification channel identifiers. In 510, the new mapping entry is added to a mapping table. For example, the new mapping is added to the mapping table by the universal notification service. In some embodiments, adding the new mapping to the mapping table allows the universal notification service to retrieve the new platform notification channel identifiers given the new universal notification channel. In 512, new platform notification channel identifiers are sent. For example, the new platform notification channel identifiers are sent from the universal notification service to the content provider. In 514, new platform notification channel identifiers are associated with the content channel. For example, new platform notification channel identifiers are associated with the content channel by the content provider. In some embodiments, the content channel comprises the content channel created in 500. In some embodiments, associating the new platform notification channel identifiers with the content channel allows the content provider to redirect a user interested in subscribing to the content channel to the appropriate platform notification channel to receive the notifications on his mobile device.

Figure 6:
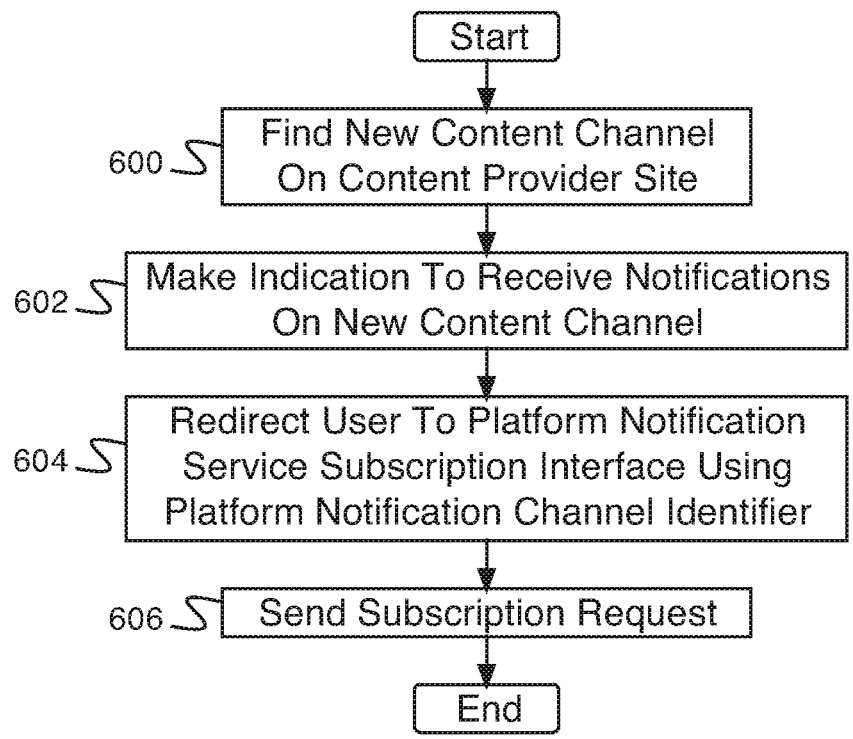
FIG. 6 is a flow diagram illustrating an embodiment of a process for subscribing to a content channel.

FIG. 6 is a flow diagram illustrating an embodiment of a process for subscribing to a content channel. In some embodiments, the process of FIG. 6 comprises a process of a notification service user (e.g., notification service user 106 of FIG. 1) subscribing to a content channel of a content provider (e.g., content provider 102 of FIG. 1) via a platform notification service (e.g., platform notification service 108 of FIG. 1, platform notification service 110 of FIG. 1, or platform notification service 112 of FIG. 1) In the example shown, in 600, a new content channel is found on a content provider site. For example, a new content channel is found on a content provider site by a notification service user. In various embodiments, a content provider site comprises a content provider website, a content provider smartphone app, a content provider standalone application, an email sent by the content provider, a newsgroup message posted by the content provider, or any other appropriate software or protocol site provided by the content provider. In some embodiments, the notification service user identifies the content channel while browsing the content provider site. In some embodiments, the notification service user navigates to the content provider site in order to find the content channel. In 602, an indication to receive notifications on the new content channel is made. For example, the indication to receive notifications on the new content channel is made by the notification service user. In some embodiments, making an indication to receive notifications on the new content channel comprises clicking a link. In some embodiments, making an indication to receive notifications on the new content channel happens mostly behind the scenes and not visible to a user; there are application programming interfaces (APIs) at work to perform the functionality and, while at some point in time some user interaction might occur, in most cases there is no direct "click on a link" connection. In some embodiments, the content provider site includes a set of links, each link specific to a particular mobile phone operating system. In some embodiments, the content provider site is able to automatically determine the mobile phone operating system in use by the notification service user and interpret the indication appropriately. In some embodiments, making an indication to receive notifications on the new content channel comprises selecting a platform notification channel identifier. In 604, the user is redirected to a platform notification service subscription interface using a platform notification channel identifier. For example, the content provider redirects the user to a platform notification service subscription interface using a platform notification channel identifier. In some embodiments, the platform notification channel identifier comprises a platform notification channel identifier selected in 602. In some embodiments, the platform notification service subscription interface is specific to the mobile phone operating system in use by the notification service user. In 606, a subscription request is sent. For example, a subscription request is sent by the notification service user, using the platform notification service subscription interface. In some embodiments, sending a subscription request registers a user to receive notifications from a platform notification service.

Figure 7:
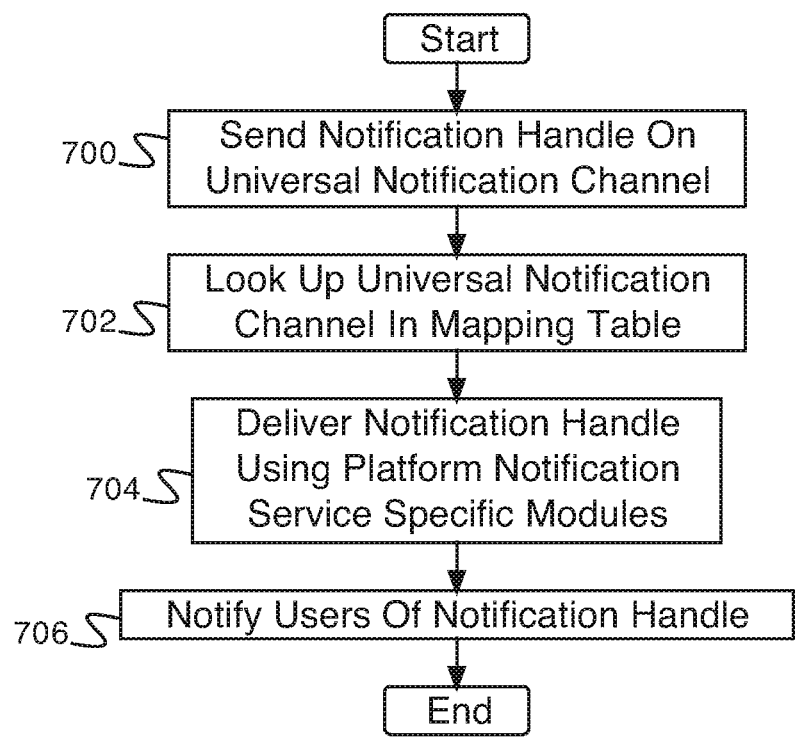
FIG. 7 is a flow diagram illustrating an embodiment of a process for distributing a notification.

FIG. 7 is a flow diagram illustrating an embodiment of a process for distributing a notification. In some embodiments, the process of FIG. 7 comprises a process for distributing a notification from a content provider (e.g., content provider 102 of FIG. 1) on a universal notification channel on a universal notification service (e.g., universal notification service 104 of FIG. 1) to a notification service user (e.g., notification service user 106 of FIG. 1) via a platform notification service (e.g., platform notification service 108 of FIG. 1, platform notification service 110 of FIG. 1, or platform notification service 112 of FIG. 1). In the example shown, in 700, a notification handle is sent on a universal notification channel. For example, a notification handle is sent by a content provider on an universal notification channel of a universal notification service. In various embodiments, a notification handle comprises an indication of a notification, a link to a notification, a summary of a notification, a notification of a notification, or any other appropriate message allowing a notification service user to retrieve a notification. In 702, the universal notification channel is looked up in the mapping table. For example, the universal notification channel is looked up in the mapping table by the universal notification service. In some embodiments, when the universal notification channel is looked up in the mapping table, platform notification channel identifiers are retrieved. In 704, the notification handle is delivered using platform notification service specific modules. For example, the notification handle is delivered to one or more platform notification services by the universal notification channel, using platform notification service specific modules. In some embodiments, platform notification channel identifiers are used to identify appropriate platform notification channels. In 706, users are notified of the notification handle. For example, users are notified of the notification handle by platform notification services. In some embodiments, notifying a user of a notification handle comprises sending a user a message including a notification handle. In some embodiments, a user can use the notification handle to retrieve an associated full notification, if desired. In some embodiments, the notification handle causes an automated download of the associated full notification.

Figure 8:
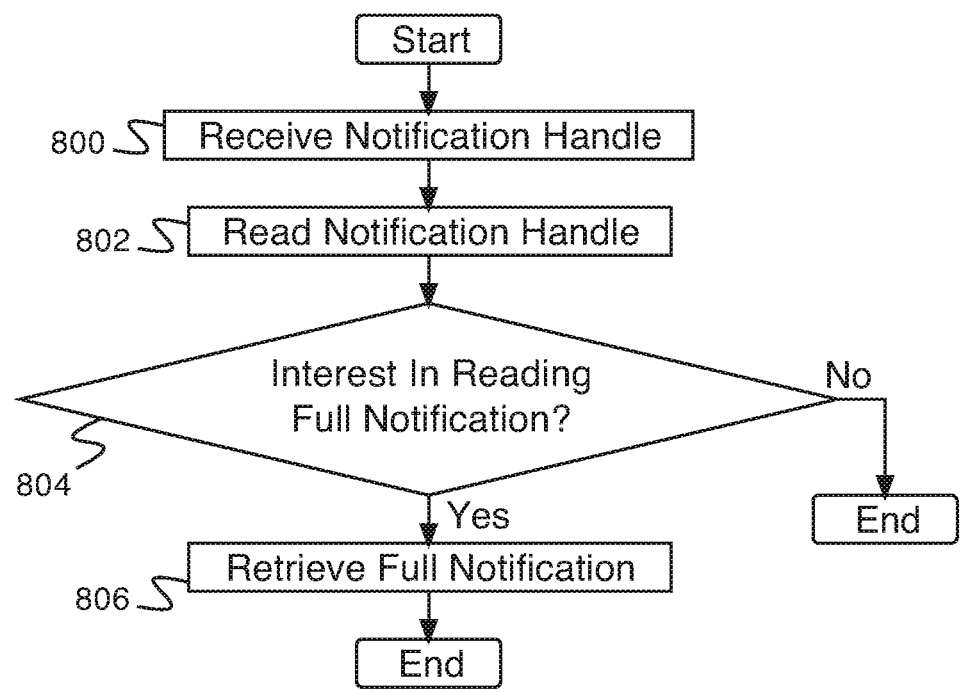
FIG. 8 is a flow diagram illustrating an embodiment of a process for receiving a notification handle.

FIG. 8 is a flow diagram illustrating an embodiment of a process for receiving a notification handle. In some embodiments, the process of FIG. 8 comprises a process for a notification service user (e.g., notification service user 106 of FIG. 1) receiving a notification handle provided by a content provider (e.g., content provider 102 of FIG. 1) on a platform notification service (e.g., platform notification service 108 of FIG. 1, platform notification service 110 of FIG. 1, or platform notification service 112 of FIG. 1). In the example shown, in 800, a notification handle is received. For example, a notification handle is received by a notification service user from a platform notification service. In 802, a notification handle is read. For example, the notification handle is read by a notification service user. In 804, it is determined if there is interest in reading the full notification. For example, it is determined if the notification service user is interested enough in the notification handle to read the associated full notification. If there is not interest in reading the full notification, the process ends. If there is interest in reading the full notification, control passes to 806. In 806, the full notification is retrieved. For example, the full notification is retrieved by the notification service user from the content provider. In various embodiments, the full notification is retrieved by the notification service user from the content provider by clicking a link, executing an application, navigating to a web site, or in any other appropriate way.

Figure 9:
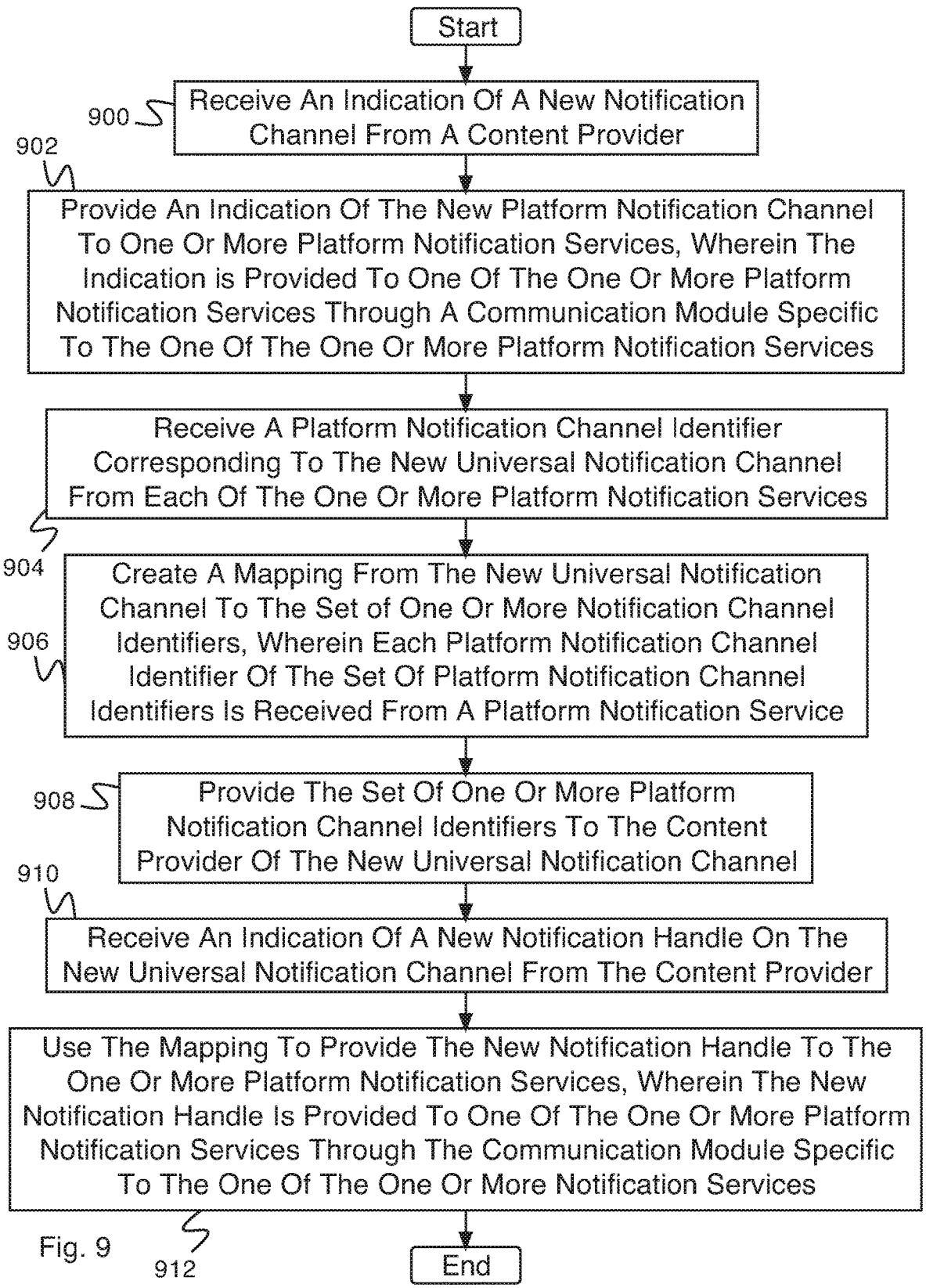
FIG. 9 is a flow diagram illustrating an embodiment of a process for delivering notification messages across different notification media.

FIG. 9 is a flow diagram illustrating an embodiment of a process for delivering notification messages across different notification media. In some embodiments, the process of FIG. 9 is executed by a universal notification service (e.g., universal notification service 104 of FIG. 1). In the example shown, in 900, the universal notification service receives an indication of a new notification channel from a content provider. In 902, the universal notification service provides an indication of the new platform notification channel to one or more platform notification services, wherein the indication is provided to one of the one or more platform notification services through a communication module specific to the one of the one or more platform notification services. In 904, the universal notification service receives a platform notification channel identifier corresponding to the new universal notification channel from each of the one or more platform notification services. In 906, the universal notification service creates a mapping from the new universal notification channel to the set of one or more notification channel identifiers, wherein each platform notification channel identifier of the set of platform notification channel identifiers is received from a platform notification service. In 908, the universal notification service provides the set of one or more platform notification channel identifiers to the content provider of the new universal notification channel. In 910, the universal notification service receives an indication of a new notification handle on the new universal notification channel from the content provider. In 912, the universal notification service uses the mapping to provide the new notification handle to the one or more platform notification services, wherein the new notification handle is sent to one of the one or more platform notification services through the communication module specific to the one of the one or more notification services.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system for delivering notifications, comprising:
a processor;
a non-transitory computer readable medium comprising instructions to:
maintain a mapping from a universal notification channel to one or more platform notification channel identifiers for one or more platform notification channels associated with the universal notification channel, wherein each platform notification channel identifier of the platform notification channel identifiers is associated with a platform notification service of one or more platform notification services, wherein
a first platform notification channel identifier from the one or more platform notification channel identifiers associated with the universal notification channel is associated with a content provider and a recipient device based on an indication from the recipient device to receive notifications associated with the universal notification channel where the first platform notification channel identifier is for a first platform notification channel at a first platform notification service that matches a criteria associated with the recipient device;
receive a notification handle on the universal notification channel from the content provider; and
provide the notification handle from the universal notification service to each of the one or more platform notification services using the mapping of the universal notification channel to the one or more platform notification service identifiers such that the recipient device is notified on the first platform notification channel by the first platform notification service on the first platform notification channel associated with the first platform notification identifier without a user registering directly at the universal notification service.

2. The system of claim 1, wherein the indication on the recipient device is a setting on the recipient device.

3. The system of claim 1, wherein the notification handle is associated with a notification for a collaborative workspace.

4. The system of claim 1, wherein the notification handle is associated with a notification for a public service message.

5. The system of claim 1, wherein notification handle is associated with a notification for two factor authentication.

6. The system of claim 1, wherein the criteria is an operating system or a type of recipient device.

7. The system of claim 1, wherein the criteria is a notification channel.

8. A method for delivering notifications, comprising:
maintaining a mapping from a universal notification channel to one or more platform notification channel identifiers for one or more platform notification channels associated with the universal notification channel, wherein each platform notification channel identifier of the platform notification channel identifiers is associated with a platform notification service of one or more platform notification services, wherein
a first platform notification channel identifier from the one or more platform notification channel identifiers associated with the universal notification channel is associated with a content provider and a recipient device based on an indication from the recipient device to receive notifications associated with the universal notification channel where the first platform notification channel identifier is for a first platform notification channel at a first platform notification service that matches a criteria associated with the recipient device;
receiving a notification handle on the universal notification channel from the content provider; and
providing the notification handle from the universal notification service to each of the one or more platform notification services using the mapping of the universal notification channel to the one or more platform notification service identifiers such that the recipient device is notified on the first platform notification channel by the first platform notification service on the first platform notification channel associated with the first platform notification identifier without a user registering directly at the universal notification service.

9. The method of claim 8, wherein the indication on the recipient device is a setting on the recipient device.

10. The method of claim 8, wherein the notification handle is associated with a notification for a collaborative workspace.

11. The method of claim 8, wherein the notification handle is associated with a notification for a public service message.

12. The method of claim 8, wherein notification handle is associated with a notification for two factor authentication.

13. The method of claim 8, wherein the criteria is an operating system or a type of recipient device.

14. The method of claim 8, wherein the criteria is a notification channel.

15. A non-transitory computer readable medium, comprising instructions for:

maintaining a mapping from a universal notification channel to one or more platform notification channel identifiers for one or more platform notification channels associated with the universal notification channel, wherein each platform notification channel identifier of the platform notification channel identifiers is associated with a platform notification service of one or more platform notification services, wherein a first platform notification channel identifier from the one or more platform notification channel identifiers associated with the universal notification channel is associated with a content provider and a recipient device based on an indication from the recipient device to receive notifications associated with the universal notification channel where the first platform notification channel identifier is for a first platform notification channel at a first platform notification service that matches a criteria associated with the recipient device;

receiving a notification handle on the universal notification channel from the content provider; and providing the notification handle from the universal notification service to each of the one or more platform notification services using the mapping of the universal notification channel to the one or more platform notification service identifiers such that the recipient device is notified on the first platform notification channel by the first platform notification service on the first platform notification channel associated with the first platform notification identifier without a user registering directly at the universal notification service.

16. The non-transitory computer readable medium of claim 15, wherein the indication on the recipient device is a setting on the recipient device.

17. The non-transitory computer readable medium of claim 15, wherein the notification handle is associated with a notification for a collaborative workspace.

18. The non-transitory computer readable medium of claim 15, wherein the notification handle is associated with a notification for a public service message.

19. The non-transitory computer readable medium of claim 15, wherein notification handle is associated with a notification for two factor authentication.

20. The non-transitory computer readable medium of claim 15, wherein the criteria is an operating system or a type of recipient device.

21. The non-transitory computer readable medium of claim 15, wherein the criteria is a notification channel.

* * * * *